United States Patent
Bhattacharjya

(10) Patent No.: US 7,620,243 B2
(45) Date of Patent: Nov. 17, 2009

(54) NOISE REDUCTION FOR PRIMARY TONES FOR IMAGE REPLICATION SYSTEMS

(75) Inventor: Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 765 days.

(21) Appl. No.: 11/304,515

(22) Filed: Dec. 14, 2005

(65) Prior Publication Data

US 2007/0133869 A1  Jun. 14, 2007

(51) Int. Cl.
  *G06K 9/00* (2006.01)
(52) U.S. Cl. .................................... 382/167
(58) Field of Classification Search ............ None
  See application file for complete search history.

(56) References Cited

U.S. PATENT DOCUMENTS

| | | | |
|---|---|---|---|
| 5,343,311 A * | 8/1994 | Morag et al. ............... 358/518 |
| 5,384,601 A * | 1/1995 | Yamashita et al. .......... 348/577 |
| 5,438,649 A * | 8/1995 | Ruetz ......................... 358/1.9 |
| 5,768,411 A | 6/1998 | Shu et al. |
| 5,903,681 A | 5/1999 | Rueby et al. |
| 5,970,178 A | 10/1999 | Lin |
| 5,970,975 A | 10/1999 | Estes et al. |
| 5,999,279 A * | 12/1999 | Kouzaki et al. ............. 358/520 |
| 6,075,887 A * | 6/2000 | Brett .......................... 382/167 |
| 6,225,974 B1 | 5/2001 | Marsden et al. |
| 6,327,052 B1 | 12/2001 | Falk |
| 6,340,975 B2 | 1/2002 | Marsden et al. |
| 6,532,081 B1 | 3/2003 | Cecchi et al. |
| 6,625,325 B2 | 9/2003 | Gindele et al. |
| 6,650,438 B1 | 11/2003 | Kress et al. |
| 6,738,510 B2 * | 5/2004 | Tsuruoka et al. ............. 382/167 |
| 6,807,300 B1 | 10/2004 | Gindele et al. |
| 6,898,312 B2 * | 5/2005 | Schroder .................... 382/167 |
| 7,230,584 B2 * | 6/2007 | Elliott ......................... 345/32 |
| 7,286,265 B2 * | 10/2007 | Kuwata et al. ............... 358/1.9 |
| 7,292,371 B2 * | 11/2007 | Kuwata et al. ............... 358/1.9 |
| 2005/0073731 A1 | 4/2005 | Deer et al. |
| 2005/0248581 A1 * | 11/2005 | Choe et al. .................. 345/581 |

* cited by examiner

*Primary Examiner*—Yuzhen Ge

(57) ABSTRACT

Systems and methods are disclosed that provide noise reduction for primary tones. In an embodiment, the systems and methods involve adjusting an input color toward a primary tone at the expense of replicating the input color according to its proper hue. The adjusted input color, when displayed by a display device, will be more visually appealing to a typical user.

14 Claims, 6 Drawing Sheets

NOISE REDUCTION FOR PRIMARY TONES FOR IMAGE REPLICATION SYSTEMS

BACKGROUND

1. Field of the Invention

The present invention relates generally to the field of image reproduction, and more particularly to systems and methods for reducing the appearance of noise in the reproduction of images.

2. Background of the Invention

When reproducing images, it is generally preferred to have the colors in the reproduced image match the colors in the original source. The colors in the reproduction are typically rendered using a mixture of primary tones.

Problems occur, however, when trying to match user expectations on pure/primary tone reproductions in, for example, a copier. Due to mismatch in color gamut between the input device, such as from a scanner, and the image displaying device, such as a printer, what may be perceived as a primary tone (e.g., red, green, blue, cyan, magenta, yellow, black, and white) in the original image, may be rendered using a combination of tones in the outputted image. While printer color tables may be designed to output minimal primaries with low halftone noise for a given color input, this property may not be preserved in a copier due to scanner and printer gamut mismatch. Even if the color being reproduced is within the color gamut of the displaying device, halftoning artifacts, arising as a result of mixing a small amount of some primary tone with other tones, may result in an appearance that is objectionable even though the average color is correctly reproduced. Furthermore, the presence of other artifacts, such as scanning noise, may also add to this problem. Thus, while from a colorimetric point of view, a correct tone, as compared to the original image, may have been reproduced, the presence of multiple, half toned colors in the output tone may be considered less acceptable by a user.

To improve the perceived quality of a reproduced image, a number of noise reduction techniques have been developed. Many of these techniques focus on reducing scanner noise; however, such noise reduction techniques do not guarantee pure tone reproduction. Thus, while a pure tone may be smoothed to eliminate pixel noise, it may map to a tone that is rendered with multiple tones.

A number of tone separation techniques have also been presented to attempt to minimize the use of primaries for the reproduction of an image, for example by a printer. However, different input image data or devices, for example from different scanners or scans, provide different inputs to the display device resulting in multiple tones at the output.

Further methods to improve the perceived quality of a reproduced image have involved improving dither noise. However, such efforts have focused on reducing dither noise and typically have not addressed the issue of pure-tone rendering.

Accordingly, systems and methods are needed that provide noise reduction for primary tones for image replication systems.

SUMMARY OF THE INVENTION

According to an aspect of the present invention, systems and methods are disclosed that provide noise reduction for primary tones.

Various systems in accordance with the present invention may be constructed. An exemplary system in which exemplary embodiments of the present invention may operate is an image replication or imaging system comprising an image data input module, an imaging module, and an image display module. In an embodiment, the image data input module may be a scanner. In an alternative embodiment, the image data input module may be a disk drive, optical drive, communications port, or other means for receiving data, such as data from a previously scanned or generated image or images. Data from the image data input module is received by the imaging module. In an embodiment, imaging module includes a primary tone noise reduction module for implementing one or more methods of reducing noise when the image data is reproduced by an image display module or device. Image display module or device may be a printer, monitor, or the like.

It shall be noted that the imaging system is an embodiment, which has been presented to facilitate the present description. It will be apparent to one skilled in the art that there are many other configurations of the imaging system and that many other operations or modules may be performed on the data. It shall be noted that no particular imaging system or imaging system configuration is critical to the practice of the present invention. It shall be noted that the components or modules of the imaging system may be combined or integrated together, may be subdivided into additional modules, and/or may be performed by separate devices. The modules of the system, or portions thereof, may be implemented in software, hardware, firmware, or a combination thereof. The imaging system may comprise one or more processors and memory for processing the data.

In the following discussion, it is assumed that red (R), green (G), and blue (B) color values and that all the color signals red (R), green (G), and blue (B) have been normalized to the unit interval, with zero (0) representing no color and one (1) representing a color level of 100%. One skilled in the art will recognize that the present invention is not limited to such embodiments, but can be utilized in other environments. The RGB configuration is exemplary and the functionality described herein may operate on other types of color configurations (including, without limitation, cyan (C), magenta (M), yellow (Y), and black (K) color configurations), as well as on grayscale images.

In an embodiment, the RGB color space may be projected to a two-dimensional hue-saturation (HS) space using vectors. In one embodiment, the vectors may be mutually orthogonal, such as, for example, $(2, -1, -1)$ and $(0, 1, -1)$. In such a configuration, the pure tones fall on the periphery of a hue-saturation circle.

In one embodiment, a method for noise reduction for primary tones involves computing the gray, lightness, or luminance value and hue-saturation components of an input color by projecting the input color along the directions given by vectors. In an embodiment, the vectors may be mutually orthogonal vector, such as, $(1, 1, 1)$, $(2, -1, -1)$, and $(0, 1, -1)$. Accordingly, the two-dimensional Cartesian coordinates of the input color projected on the HS-plane, denoted as $(In_x, In_y)$, may be obtained.

The hue angle, $\theta$, of the input color may be used to associate the input color with a closest primary tone. In one embodiment, the HS plane may be divided into two or more interval segments. In an embodiment, each interval contains or is assigned one primary tone. The closest primary tone of an input color is the primary tone with an assigned hue-angle interval that contains the hue angle of the input color. It should be noted that the interval segments may be of equal size or may vary in size. For the purposes of illustration, the two-dimensional coordinates for the closest primary tone in the HS plane are denoted $(P_x, P_y)$. In an embodiment, the closest primary tone is at the same saturation level as the input color.

According to an embodiment, to obtain the output color, a weighted function may be employed to perform smooth color transformations to the imaging display module profile. In one embodiment, the weighted factor function may vary based on the gray level of the input color, which may be obtained by projecting the RGB along the vector (1, 1, 1). According to an embodiment, the weighted factor function may be selected according to user preferences. In an embodiment, a family of weighted factor functions may be directly proportional to a sigmoidal function. In an alternative embodiment, the weighted factor function may be related to the hue angle, θ, of the input color, the input color's gray level, and/or one or more gray-level dependent constants that control the shape of the weighted factor function. According to an embodiment, one or more of the gray-level dependent values may be subjective to a user and may be set by a user or may be set by a manufacturer of the image display module. It should be noted that the one or more of the gray-level may be varied with respect to the gray level. In one embodiment, the weights are normalized to the unit interval using a linear mapping.

In an embodiment, given a weighted factor function, the output color HS-plane coordinates, denoted $(Out_x, Out_y)$, may be obtained by summing the closest primary tone $(P_x, P_y)$ multiplied by a first weighted factor, which may be determined from a weighted factor function, plus the input color $(In_x, In_y)$ multiplied by a second weighted factor. In an embodiment, the second weighted factor may be related to the first weighted factor.

Because people tend to find colors with higher saturation levels more visually appealing, the process of obtaining the output color may include one or more factors to enhance the saturation of the output color.

In an embodiment, the gray value for the color may be modified by applying a monotonically non-decreasing function to the input gray value. This gray value is combined with $(Out_x, Out_y)$ to generate the resulting RGB data for the output color.

One skilled in the art will recognize that the systems and methods have been presented for matching user expectations for primary/pure tone reproduction by processing a color matched image. One skilled in the art will also recognize implementations of the present invention smoothly transforms the color space to reduce the number of primaries used in rendering pure tones while maintaining good calorimetric color reproduction. Furthermore, it shall be noted that implementations of the transformations reduce pure-tone reproduction noise without introducing undesirable artifacts, such as, for example, tone inversion.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the drawings, specification, and claims hereof.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE INVENTION

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. Furthermore, the appearance of the phrase "in one embodiment," "in an embodiment," or the like in various places in the specification are not necessarily all referring to the same embodiment.

As discussed previously, problems can occur when trying to match user expectations on pure/primary tone reproductions in, for example, a copier. Users typically prefer pure tones rendered with fewer primaries (low halftone noise) over colorimetric accuracy. Furthermore, since a user generally does not see the original version of the image, it is more aesthetically pleasing to produce the copy with pure tones at the expense of color matching. Accordingly, aspects of the present invention deal with improving the perceived quality of the reproduced image.

Figure 1:
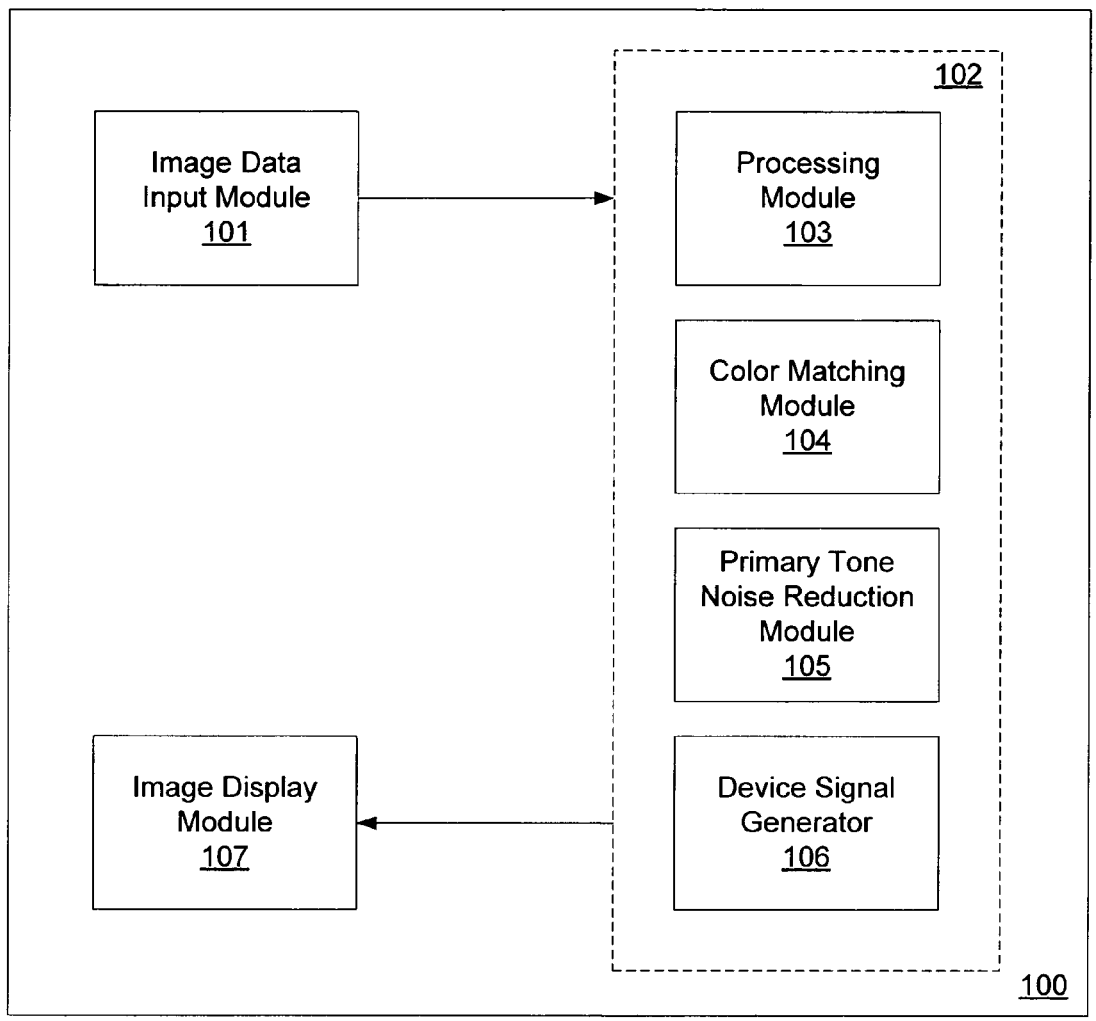
FIG. 1 is a functional block diagram illustrating an exemplary system in which exemplary embodiments of the present invention may operate.

Various systems in accordance with the present invention may be constructed. FIG. 1 is a block diagram illustrating an exemplary system in which exemplary embodiments of the present invention may operate. It shall be noted that the present invention may operate, and be embodied in, other systems as well, including without limitation any device or systems for displaying an image.

FIG. 1 is a simplified functional block diagram illustrating an embodiment of an image replication or imaging system, which may be a copier pipeline, configured to provide primary tone noise reduction functionality in accordance with an embodiment of the invention. Depicted in FIG. 1 is a typical image replication system 100 with the addition of a primary tone noise reduction module 105.

The image replication system 100 comprises an image data input module 101 for receiving image data and is communicatively coupled to an imaging module 102, which is communicatively coupled to an image display module 107. The terms "coupled" and "communicatively coupled" shall be understood to include direct connections and indirect connections through one or more intermediary devices. In an embodiment, image data input module 101 may be a scanner. In an alternative embodiment, image data input module 101 may be a disk drive, optical drive, communications port, or other means for receiving data, such as data from a previously scanned or generated image or images. Data from image data input module 101 is received by the imaging module 102. In the depicted embodiment, imaging module 102 includes a processing module 103, which may enhance the image data and remove scanning artifacts, such as Moire patterns; a color matching module 104, which may match scanned colors to an output device, such as image display module 107; a primary tone noise reduction module for reducing noise; and a device signal generator 106 that converts colors to a set of signals that drive the image display module or device 107 to render the output. In an embodiment, the device signal generator 106 may comprise multiple components, such as tone separation, halftoning, and pulse generation. The processed image data is outputted to image display module 107. Image display module 107 may be a printer, monitor, or the like.

It shall be noted that imaging system 100 is one embodiment, which has been presented to facilitate the present description. It will be apparent to one skilled in the art that there are many other configurations of imaging system 100 and that many other operations or modules may be performed on the data. It shall be noted that no particular imaging system or imaging system configuration is critical to the practice of the present invention. It shall be noted that the components or modules of system 100 may be combined or integrated together, may be subdivided into additional modules, and/or may be performed by separate devices. The modules of system 100, or portions thereof, may be implemented in software, hardware, firmware, or a combination thereof. System 100 may comprise one or more processors and memory for processing the data.

One skilled in the art will recognize that one method for matching scanner and printer color spaces is via the use of an intermediate color space. A scanner color profile matches scanned colors to the intermediate color space, and a printer color profile is used to map colors from this space to device colors. In an embodiment, the intermediate color space may be a perceptually uniform calorimetric space, such as, for example, CIE Lab. In an alternative embodiment, a non-perceptually uniform colorimetric space may be used. For purpose of illustration, assume image display device 107 coordinates denoted R, G, and B, which correspond to red, green, and blue primary tones, and assume that the tone separation and halftoning algorithms have been designed so that pure tones are rendered using minimal primary colors. For example, in a printer using four primary color tones (e.g., cyan, magenta, yellow, and black), the tone R=100%, G=0%, and B=0% would be generated using only magenta and yellow, while the tone R=100%, G=100%, and B=0% would be generated using only the yellow primary. In the following discussion, it is assumed that all the color signals (R, G, B) have been normalized to the unit interval, with zero (0) representing no color and one (1) representing a color level of 100%. One skilled in the art will recognize that the present invention is not limited to such embodiments, but can be utilized in other environments. The RGB configuration is exemplary and the functionality described herein may operate on other types of color spaces, as well as on grayscale images.

Figure 3:
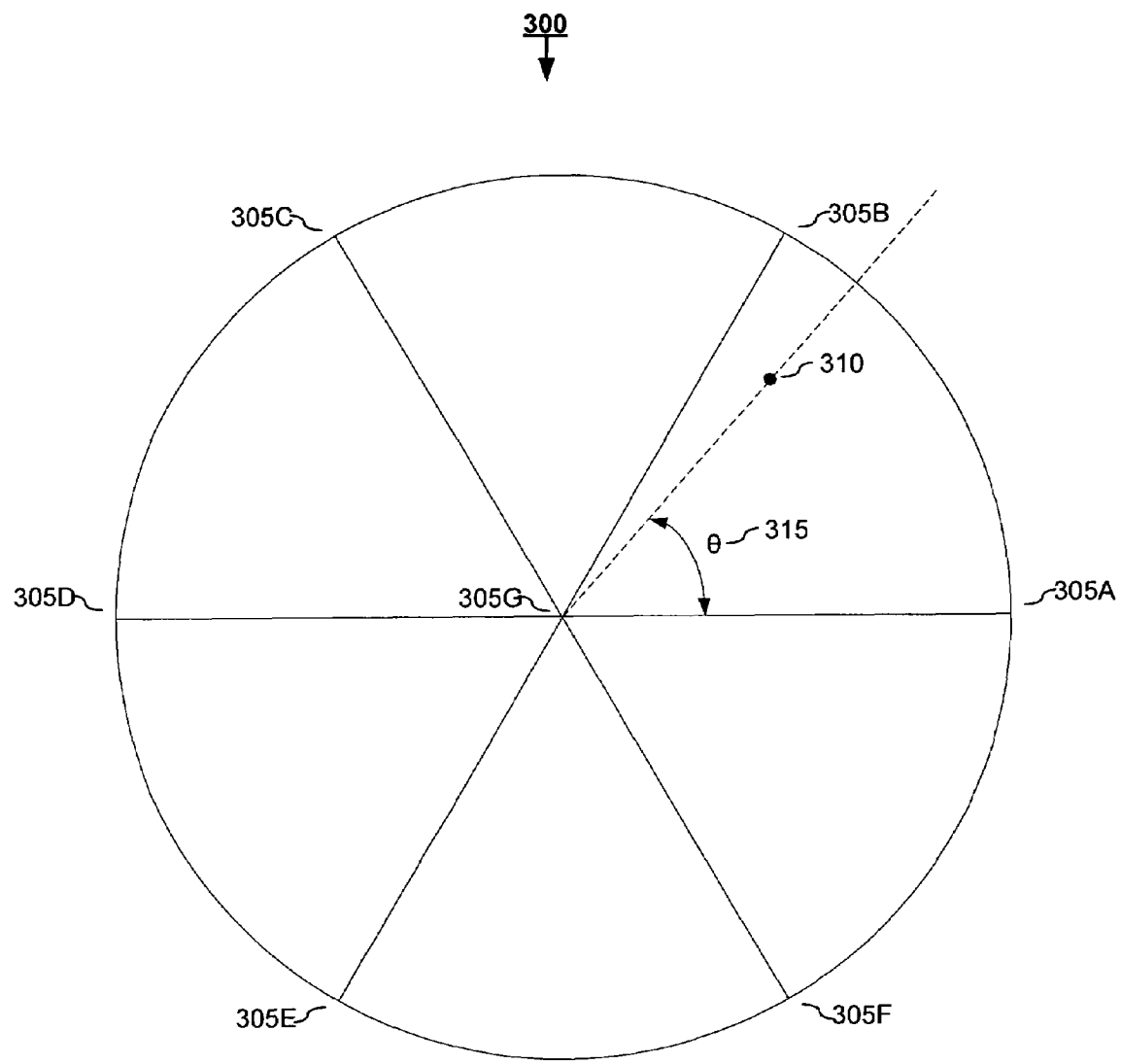
FIG. 3 depicts a hue-saturation plane according to an embodiment of the present invention.

In an embodiment, the RGB space may be projected to a two-dimensional hue-saturation (HS) space using vectors along the directions (2, −1, −1) and (0, 1, −1). As depicted in FIG. 3, in such a configuration, the pure tones fall on the periphery of a circle 300 along the directions given by red 305A at 0 degrees, yellow 305B at 60 degrees, green 305C at 120 degrees, cyan 305D at 180 degrees, blue 305E at 240 degrees, and magenta 305F at 300 degrees. Black and white share the same location 305G of this circle 300. While this color space may not calorimetric, the distance from the origin corresponds largely to color saturation (S) and the angle corresponds to the hue (H).

Figure 2:
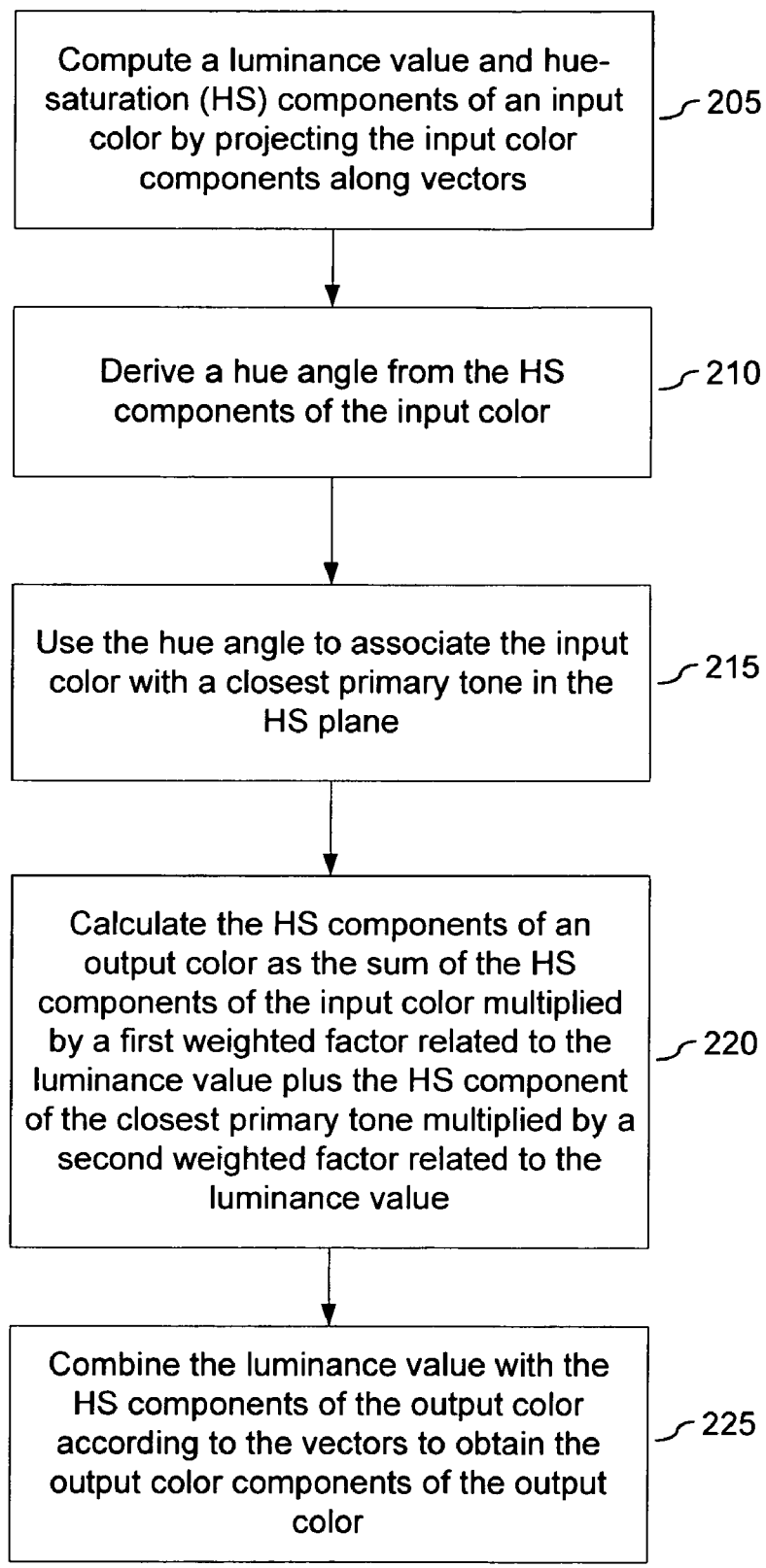
FIG. 2 depicts an embodiment of a method for noise reduction for primary tones according to an embodiment of the present invention.

FIG. 2 depicts an embodiment of a method for noise reduction for primary tones according to an embodiment of the present invention. The gray, lightness, or luminance value and hue-saturation components of an input color are determined (205) by projecting the input color along the directions given by vectors. In an embodiment, the vectors may be mutually orthogonal vector, such as, (1, 1, 1), (2, −1, −1), and (0, 1, −1). The two-dimensional Cartesian coordinates of the input color projected on the HS-plane, denoted as ($In_x$, $In_y$), may be obtained (205) according to the following equation:

$$(In_x, In_y) = \left( \frac{2R - G - B}{\sqrt{6}}, \frac{G - B}{\sqrt{2}} \right) \quad (1)$$

The hue angle, denoted θ, is given (210) by:

$$\theta = \tan^{-1}\left(\frac{In_y}{In_x}\right) \quad (2)$$

FIG. 3 depicts an exemplary input color 310 positioned in the HS plane 300. The hue angle, θ, 315 is also depicted.

Figure 4:
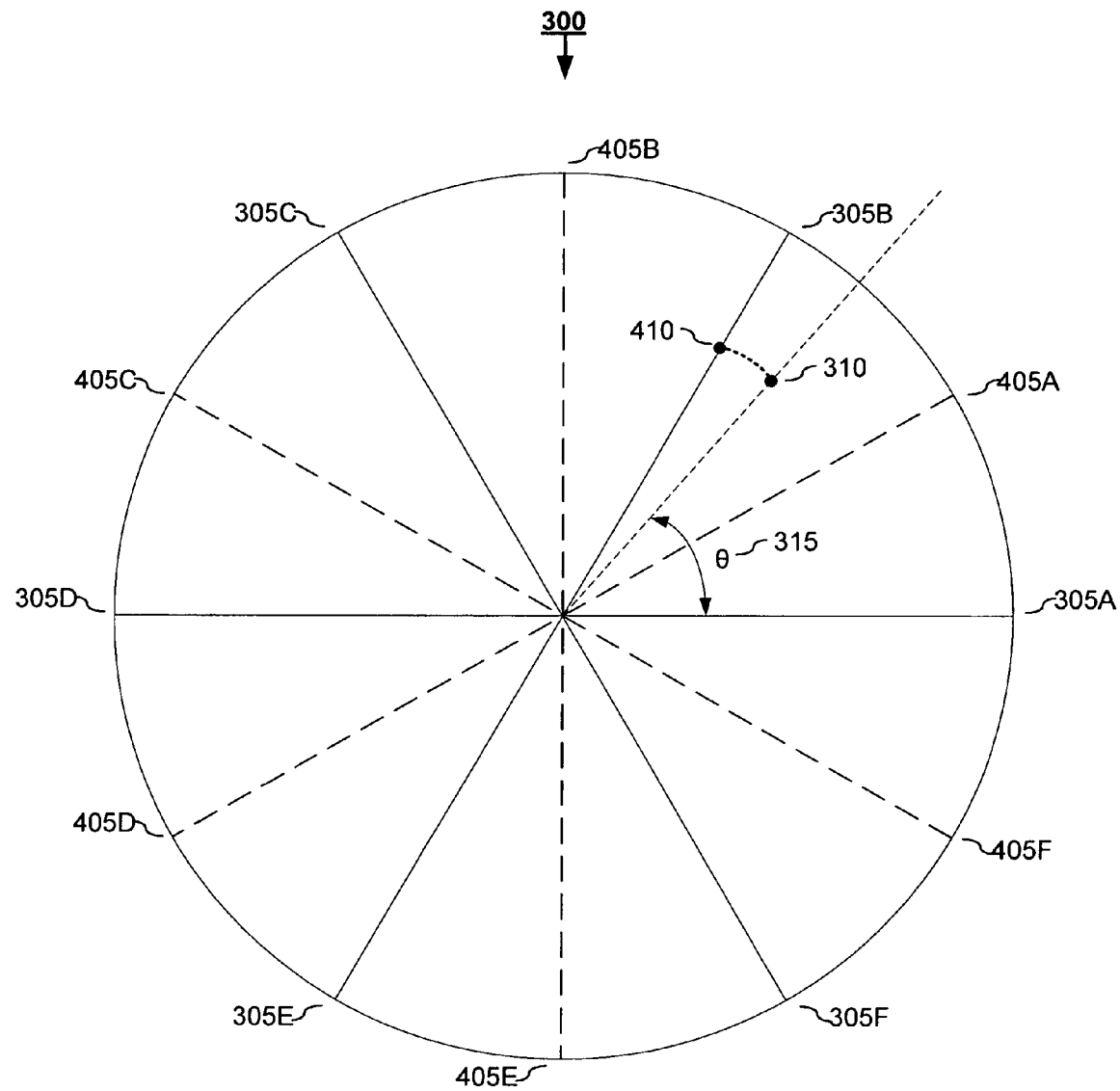
FIG. 4 depicts a hue-saturation plane with interval segments according to an embodiment of the present invention.

The hue angle, θ, obtained according to Equation (2), above, may be used to associate (215) the input color 310 with the closest primary tone. In one embodiment, the HS plane 300 may be divided into two or more interval segments as depicted by lines 405A-405F in FIG. 4. In an embodiment, each interval contains or is assigned one primary tone. The closest primary tone of an input color is the primary tone with an assigned hue-angle interval that contains the hue angle of the input color. For example, as depicted in FIG. 4, assume yellow 305B is the primary tone at 305B on the HS-plane 300, and yellow is bounded by interval lines 405A and 405B. In an embodiment, any input color with a hue angle greater than or equal to the interval angle demarcated by interval line 405A but less than the interval angle demarcated by interval line 405B will be associated with yellow 305B. It should be noted that the interval segments may be of equal size or may vary in size. For the purposes of illustration, the two-dimensional coordinates for the closest primary tone 410 in the HS plane 300 are denoted ($P_x$, $P_y$). In an embodiment, the closest primary tone 410 may be set at the same saturation level as the input color 310.

According to an embodiment, to obtain the output color, a weighted factor function may be employed to perform smooth color transformations to the imaging display module profile. In one embodiment, the weighted factor function may vary based on the gray level of the input color, which maybe obtained by projecting the RGB along the vector (1, 1, 1), hue angle, and/or one or more gray-dependent variables. According to an embodiment, a family of weighted factor functions may be given by the following equation:

$$w(\theta, g) \propto \frac{1}{1 + e^{-a_g(\cos^2(3\theta) - d_g)}} \quad (3)$$

In Equation (3), above, $\theta$ denotes the hue angle, g denotes the gray level, and $a_g$ and $d_g$ are gray-level dependent constants that affect the shape of the weighted factor function. In one embodiment, the weights are normalized to the unit interval using a linear mapping.

In an embodiment, $a_g$ and $d_g$ are gray-level dependent numbers that control the shape of the weighting function and may be designed based on the appearance of color noise in the output. Since different output media, in the case of a copier, show different amounts of noise for the same proportions of primary tones mixed in a color, these numbers may be determined experimentally. Given an perceptual model relating the primaries, a halftone algorithm, and output media to perceived quality, $a_g$ and $d_g$ may be estimated mathematically based on specified quality thresholds in the model.

Figure 5:
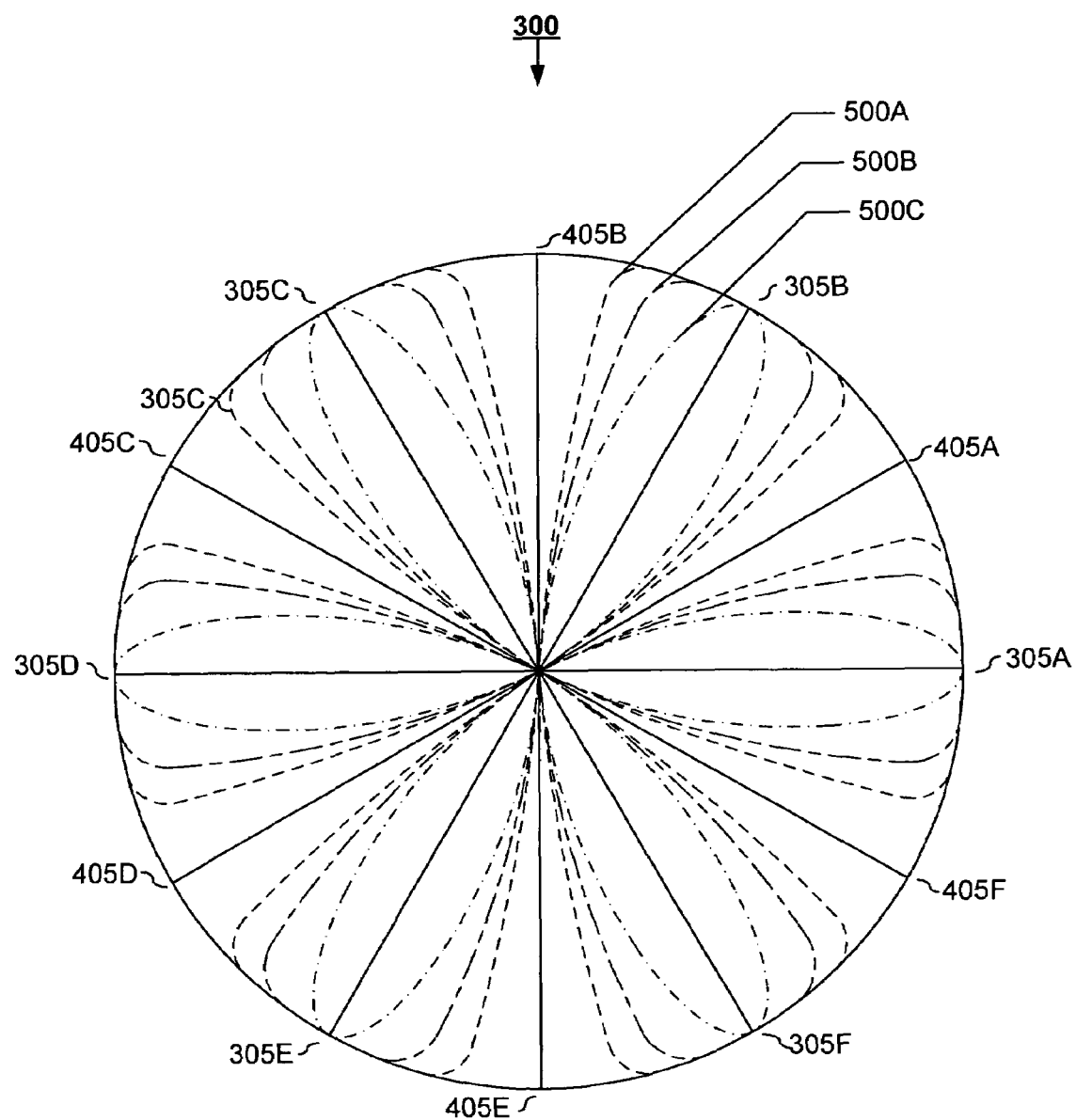
FIG. 5 depicts a hue-saturation plane with three different weighted factor functions according to embodiments of the present invention.

FIG. 5 depicts a hue-saturation plane 300 with three different weighted factor functions according to embodiments of the present invention. FIG. 5 illustrates three different weighted factor functions, 500A-500C, corresponding to three different settings for $a_g$ and $d_g$. In an embodiment, the values of $a_g$ and $d_g$ may be subjective to a user and may be set by a user or may be set by a manufacturer of image display module 107.

It should be noted that the controls, $a_g$ and $d_g$, may be smoothly varied with respect to the gray level so that lighter tones have wider lobes (as in FIG. 5, weighted factor function 500A) and darker tones have smaller lobes (as in FIG. 5, weighted factor function 500C). This smooth variance accounts for the increased visual sensitivity to multiple colors at lighter tones. In an embodiment, the width of the lobes of a weighted factor function may be determined by the maximum calorimetric distortion, $\Delta E_{Lab}$, allowed for pure-tone output. It shall be noted that $\Delta E_{Lab}$ is a well-known concept to those skilled in the art of color science. In an embodiment, the modification of any input color may be restricted to lie within a sphere of specified radius in Lab space. In the illustrated embodiment, $a_g$ and $d_g$ may be selected such that the maximum correction over the entire set of input colors (with the specified g level) satisfies the sphere constraint. The weighted factor function described with respect to Equation (3) is presented to elucidate the present invention; it should be noted that other weighted factor functions may be employed.

In an embodiment, given a weighted factor function, the output color HS-plane coordinates, denoted $(Out_x, Out_y)$, may be obtained by the following equation:

$$(Out_x, Out_y) = (1 - w(\theta, g))(In_x, In_y) + w(\theta, g)(P_x, P_y) \quad (4)$$

Because people tend to find colors with higher saturation levels more visually appealing, given a weighted factor function, the output color HS-plane coordinates, $(Out_x, Out_y)$, may be obtained, in an embodiment, by the following equation:

$$(Out_x, Out_y) = (1 - w(\theta, g))(In_x, In_y) + \frac{w(\theta, g)\beta_g\sqrt{In_x^2 + In_y^2}}{\sqrt{P_x^2 + P_y^2}}(P_x, P_y) \quad (5)$$

wherein the factor $\beta_g$ may be used to enhance the saturation of the output color by setting it to a number greater than 1. In one embodiment, if $\beta_g\sqrt{In_x^2 + In_y^2} > \sqrt{P_x^2 + P_y^2}$, the value of $\beta_g$ used in Equation (5), above, may be given by:

$$\beta_g = \frac{\sqrt{P_x^2 + P_y^2}}{\sqrt{In_x^2 + In_y^2}} \quad (6)$$

In an embodiment, the gray value for the color may be modified by applying a monotonically non-decreasing function to the input gray value. This gray value is combined with $(Out_x, Out_y)$ to generate the resulting RGB using the following equation:

$$(R, G, B) = \frac{grey_{out}}{\sqrt{3}}(1, 1, 1) + \frac{Out_x}{\sqrt{6}}(2, -1, -1) + \frac{Out_y}{\sqrt{2}}(0, 1, -1) \quad (7)$$

Figure 6:
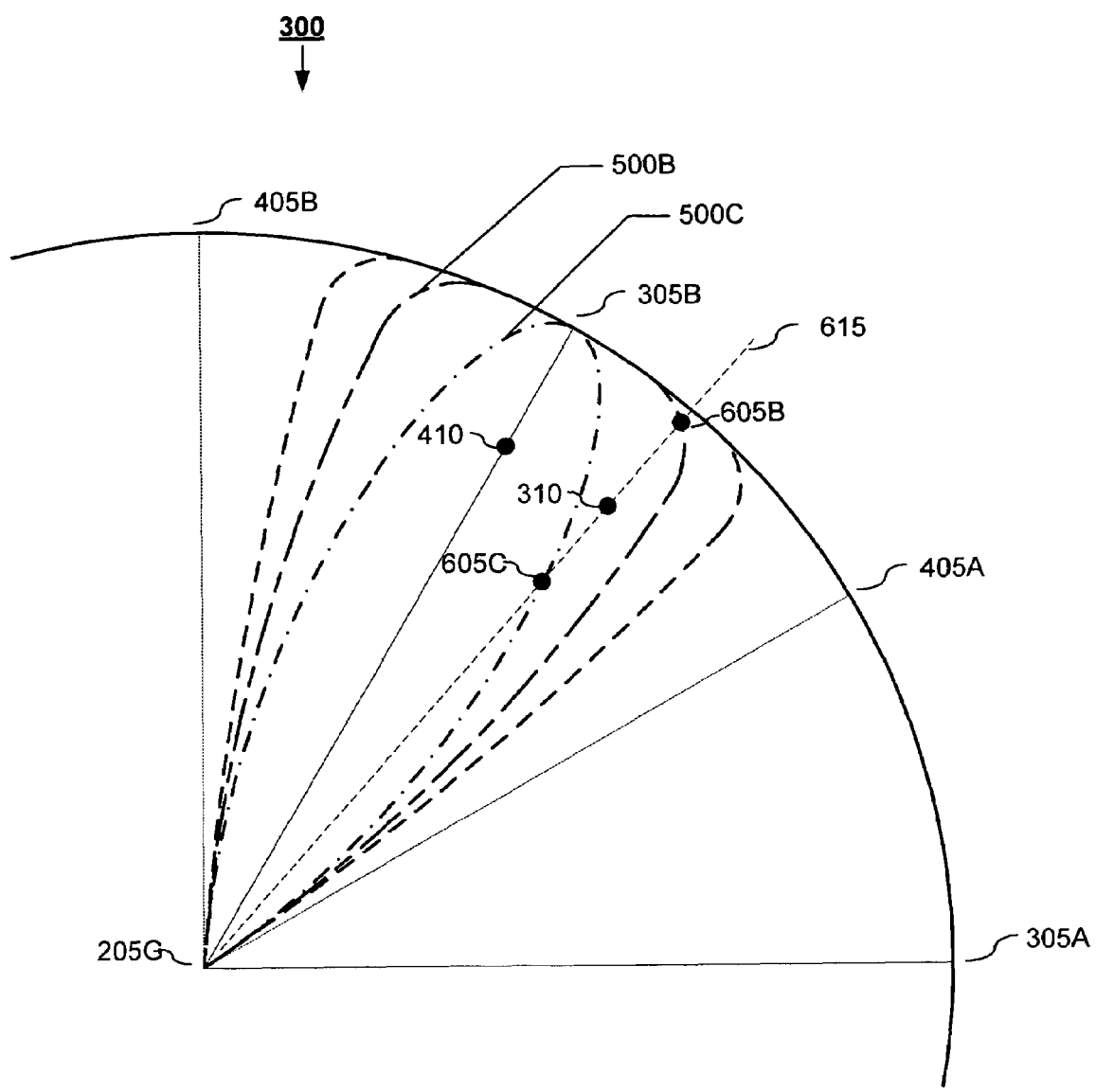
FIG. 6 depicts a portion of the hue-saturation plane according to embodiments of the present invention

FIG. 6 graphically illustrates an embodiment of a method for noise reduction for primary tones. FIG. 6 depicts a portion of the hue-saturation plane 300, an input color $(In_x, In_y)$ 310 projected onto the hue-saturation plane, and its associated closest primary tone $(P_x, P_y)$ 410 according to an embodiment of the present invention. Assuming for the purposes of illustration that the weighted factor function utilized is one such as that graphically depicted as the plot 500B, the weighted factor function value may be determined as the intersection 605B of the hue angle line 615 and the weighted factor function 500B. Given the weighted factor value 605B, an output color coordinates, $(Out_x, Out_y)$, may be obtained, for example, but using either Equation (4) or (5).

By way of further illustration, assuming the weighted factor function was the one depicted as 500C, the weighted factor function value may be determined as the intersection 605C of the hue angle line 615 and the weighted factor function 500C. Given the weighted factor value 605C, an output color coordinates, $(Out_x, Out_y)$, may be obtained, for example, but using either Equation (4) or (5).

As noted previously, the present invention may also be utilized for grayscale images. For example, in an embodiment, one dimensional curves may be specified that alter the tones so that very light tones that have low densities of white dots on black, or dark tones with low densities of white dots on black are eliminated as a result of the transformation. In an embodiment, sigmoidal functions composed around pure black and pure white tones may specify the mixing weights. Accordingly, one skilled in the art will recognize that the same or similar results may be achieved for grayscale by utilizing the same or similar methods described above.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

In addition, embodiments of the present invention further relate to computer products with a computer-readable medium that have computer code thereon for causing a computer or other processor-controlled device to perform various operations described above. The media on which the computer code is embodied may be of any suitable kind.

Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application-specific integrated circuits (ASICs), programmable logic devices (PLDs) and ROM and RAM devices. The media may further include a carrier wave on which the computer code is carried. Examples of computer code include machine code, such as produced by a compiler, and files containing higher level code that are executed by a computer using an interpreter.

I claim:

1. A method for reducing the perceived noise associated with a replication of an input color stored in memory comprising:
    adjusting the input color toward a primary tone at the expense of replicating the input color stored in memory according to its proper hue comprising the steps of:
    computing a luminance value and hue-saturation components of the input color by projecting the input color components along a set of vectors;
    deriving a hue angle from the hue-saturation components of the input color;
    using the hue angle to associate the input color with a closest primary tone;
    calculating the hue-saturation components of the output color as the sum of the hue-saturation components of the closest primary tone multiplied by a first weighted factor multiplied by a second weighted factor, wherein the first weighted factor is related to the hue angle and the luminance value of the input color; and
    combining the luminance value with the hue-saturation components of the output color according to the set of vectors to obtain the color components of the output color; and
    displaying an output color wherein the output color is the adjusted input color stored in memory.

2. The method of claim 1 wherein the set of vectors are mutually orthogonal.

3. The method of claim 1 wherein step of using the hue angle to associate the input color with a closest primary tone comprises the steps of:
    assigning hue-angle intervals to a set of primary tones;
    associating the input color with the primary tone from the set of primary tones with an assigned hue-angle interval that contains the hue angle of the input color.

4. The method of claim 1 wherein the first weighted factor accounts for increased visual sensitivity of lighter tones.

5. The method of claim 1 wherein the saturation of the output color is at least equivalent to the saturation of the input color.

6. A system for reducing the perceived noise associated with a replication of an input color comprising:
    a processor;
    a memory module;
    an image data input module implemented by the processor for receiving image data wherein said image data comprises data about an input color;
    an imaging module communicatively coupled to the image data input module for receiving the data about the input color and adjusting the image color toward a primary tone at the expense of replicating the input color according to its proper hue; and
    the processor adjusts the image color by performing steps comprising:
        computing on the processor a luminance value and hue-saturation components of the input color by projecting the input color components along a set of vectors;
        deriving on the processor a hue angle from the hue-saturation components of the input color;
        using on the processor the hue angle to associate the input color with a closest primary tone;
        calculating on the processor the hue-saturation components of the output color as the sum of the hue-saturation components of the closest primary tone multiplied by a first weighted factor and the hue-saturation components of the input color multiplied by a second weighted factor, wherein the first weighted factor is related to the hue angle and the luminance value of the input color; and
        combining on the processor the luminance value with the hue-saturation components of the output color according to the set of vectors to obtain the color components of the output color.

7. The system of claim 6 wherein the set of vectors are mutually orthogonal.

8. The system of claim 6 wherein step of using the hue angle to associate the input color with a closest primary tone comprises the steps of:
    assigning hue-angle intervals to a set of primary tones;
    associating the input color with the primary tone from the set of primary tones with an assigned hue-angle interval that contains the hue angle of the input color.

9. The system of claim 6 wherein the first weighted factor accounts for increased visual sensitivity of lighter tones.

10. A computer-readable storage medium storing one or more sequences of instructions which, when executed by one or more processors, cause the one or more processors to perform at least the steps of:
    adjusting the input color toward a primary tone at the expense of replicating the input color according to its proper hue comprises the steps of:
        computing a luminance value and hue-saturation components of the input color by projecting the input color components along a set of vectors;
        deriving a hue angle from the hue-saturation components of the input color;
        using the hue angle to associate the input color with a closest primary tone;
        calculating the hue-saturation components of the output color as the sum of the hue-saturation components of the closest primary tone multiplied by a first weighted factor and the hue-saturation components of the input color multiplied by a second weighted factor, wherein the first weighted factor is related to the hue angle and the luminance value of the input color; and
        combining the luminance value with the hue-saturation components of the output color according to the set of vectors to obtain the color components of the output color; and
    obtaining the components of an output color wherein the output color is the adjusted input color.

11. The computer-readable medium of claim 10 wherein the set of vectors are mutually orthogonal.

12. The computer-readable medium of claim 10 wherein step of using the hue angle to associate the input color with a closest primary tone comprises the steps of:
assigning hue-angle intervals to a set of primary tones;
associating the input color with the primary tone from the set of primary tones with an assigned hue-angle interval that contains the hue angle of the input color.

13. The computer-readable medium of claim 10 wherein the first weighted factor accounts for increased visual sensitivity of lighter tones.

14. The computer-readable medium of claim 10 wherein the saturation of the output color is at least equivalent to the saturation of the input color.

* * * * *